US010532720B2

(12) United States Patent
Froitzheim et al.

(10) Patent No.: US 10,532,720 B2
(45) Date of Patent: Jan. 14, 2020

(54) METHODS AND APPARATUSES FOR UNLOCKING A MOTOR VEHICLE HAVING AN ENGINE START AND/OR VEHICLE ENTRY SYSTEM

(71) Applicant: Continental Automotive GmbH, Hannover (DE)

(72) Inventors: Herbert Froitzheim, Pettendorf (DE); Robert Obermaier, Hemau-Hohenschambach (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/074,517

(22) PCT Filed: Jan. 25, 2017

(86) PCT No.: PCT/EP2017/051529
§ 371 (c)(1),
(2) Date: Aug. 1, 2018

(87) PCT Pub. No.: WO2017/133943
PCT Pub. Date: Aug. 10, 2017

(65) Prior Publication Data
US 2019/0039567 A1    Feb. 7, 2019

(30) Foreign Application Priority Data
Feb. 3, 2016 (DE) .................. 10 2016 201 603

(51) Int. Cl.
*B60R 25/24*    (2013.01)
*G07C 9/00*    (2006.01)
*H04W 76/10*    (2018.01)

(52) U.S. Cl.
CPC .......... *B60R 25/24* (2013.01); *G07C 9/00309* (2013.01); *B60R 2325/101* (2013.01);
(Continued)

(58) Field of Classification Search
CPC .............. B60R 2325/101; B60R 25/24; G07C 2009/00341; G07C 2009/0038;
(Continued)

(56) References Cited
U.S. PATENT DOCUMENTS 8,841,987 B1 * 9/2014 Stanfield ............ G07C 9/00896
340/5.61
8,995,914 B2    3/2015 Nishidai ...................... 455/41.2
(Continued)

FOREIGN PATENT DOCUMENTS

DE    19950084 C1    8/2001
DE    102010061111 A1    6/2012
(Continued)

OTHER PUBLICATIONS

Kim, H. et al., "EAP Bluetooth Application; draft-kim-eap-bluetooth-00," Internet Engineering Taskforce, Internet Society, 23 pages, Feb. 9, 2004.
(Continued)

*Primary Examiner* — Hirdepal Singh
(74) *Attorney, Agent, or Firm* — Slayden Grubert Beard PLLC

(57) ABSTRACT

Various embodiments may include systems for unlocking a motor vehicle. For example, an apparatus may include: a motor vehicle key for unlocking a motor vehicle having a remote engine start and/or vehicle entry system. The motor vehicle key comprises a Bluetooth antenna and a motor vehicle communication antenna. A controller of the motor vehicle key is configured to: use the Bluetooth antenna to set up a Bluetooth link to a mobile radio terminal using an activation key stored in a memory of the motor vehicle key; and instruct a motor vehicle controller installed in the motor vehicle to prompt an operation of the motor vehicle.

9 Claims, 5 Drawing Sheets

(52) U.S. Cl.
CPC ............... *G07C 2009/0038* (2013.01); *G07C 2009/00341* (2013.01); *G07C 2009/00428* (2013.01); *G07C 2009/00992* (2013.01); *H04W 76/10* (2018.02)

(58) Field of Classification Search
CPC .......... G07C 2009/00428; G07C 2009/00992; G07C 9/00309; H04W 76/10
USPC ....................................................... 340/5.61
See application file for complete search history.

(56) References Cited

U.S. PATENT DOCUMENTS

| | | | |
|---|---|---|---|
| 2014/0188309 A1* | 7/2014 | Caratto ................... | B60R 25/00 701/2 |
| 2015/0235486 A1* | 8/2015 | Ellis ................... | G07C 9/00309 340/5.61 |
| 2015/0312655 A1* | 10/2015 | Balakrishnan ........... | H04Q 9/00 340/870.07 |
| 2016/0049033 A1* | 2/2016 | Sigal ....................... | B60R 25/24 340/5.61 |
| 2016/0358389 A1* | 12/2016 | Menard .............. | G07C 9/00309 |
| 2017/0374550 A1* | 12/2017 | Auer .................... | H04B 5/0025 |
| 2018/0300975 A1* | 10/2018 | Oberbeckmann ....... | E05B 81/76 |

FOREIGN PATENT DOCUMENTS

| | | |
|---|---|---|
| DE | 102014207305 A1 | 10/2014 |
| EP | 2361800 B1 | 4/2013 |
| WO | 2015/091951 A1 | 6/2015 |
| WO | 2016/054276 A1 | 4/2016 |
| WO | 2017/133943 A1 | 8/2017 |

OTHER PUBLICATIONS

Kim, Hahnsang et al., "A Bypassing Security Model for Anonymous Bluetooth Peers," International Conference on Wireless Networks, Communications and Mobile Computing, vol. 1, pp. 310-315, Jun. 13, 2005.

German Office Action, Application No. 102016201603.2, 6 pages, dated Sep. 15, 2016.

International Search Report and Written Opinion, Application No. PCT/EP2017/051529, 36 pages, dated Apr. 25, 2017.

* cited by examiner

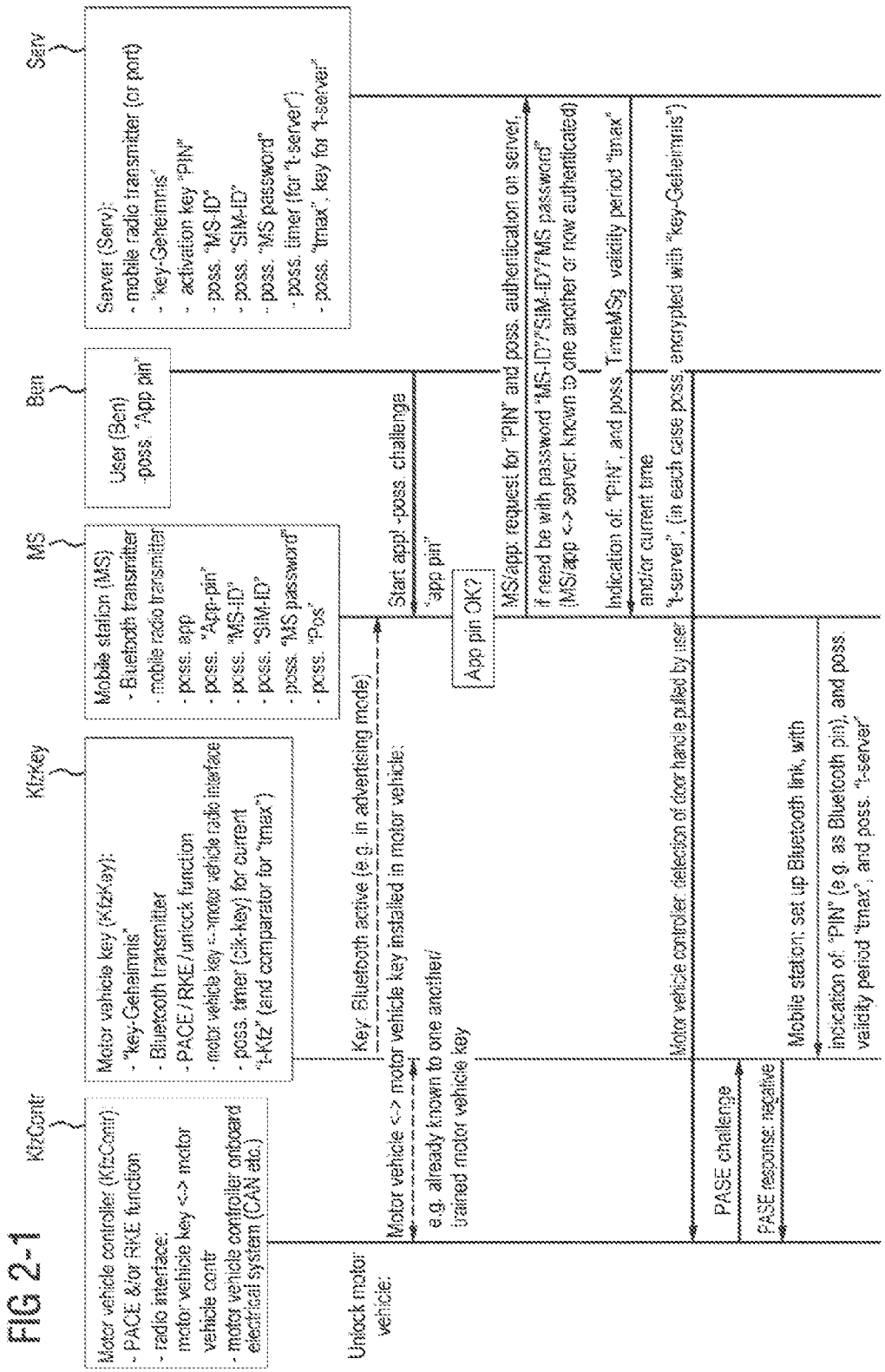

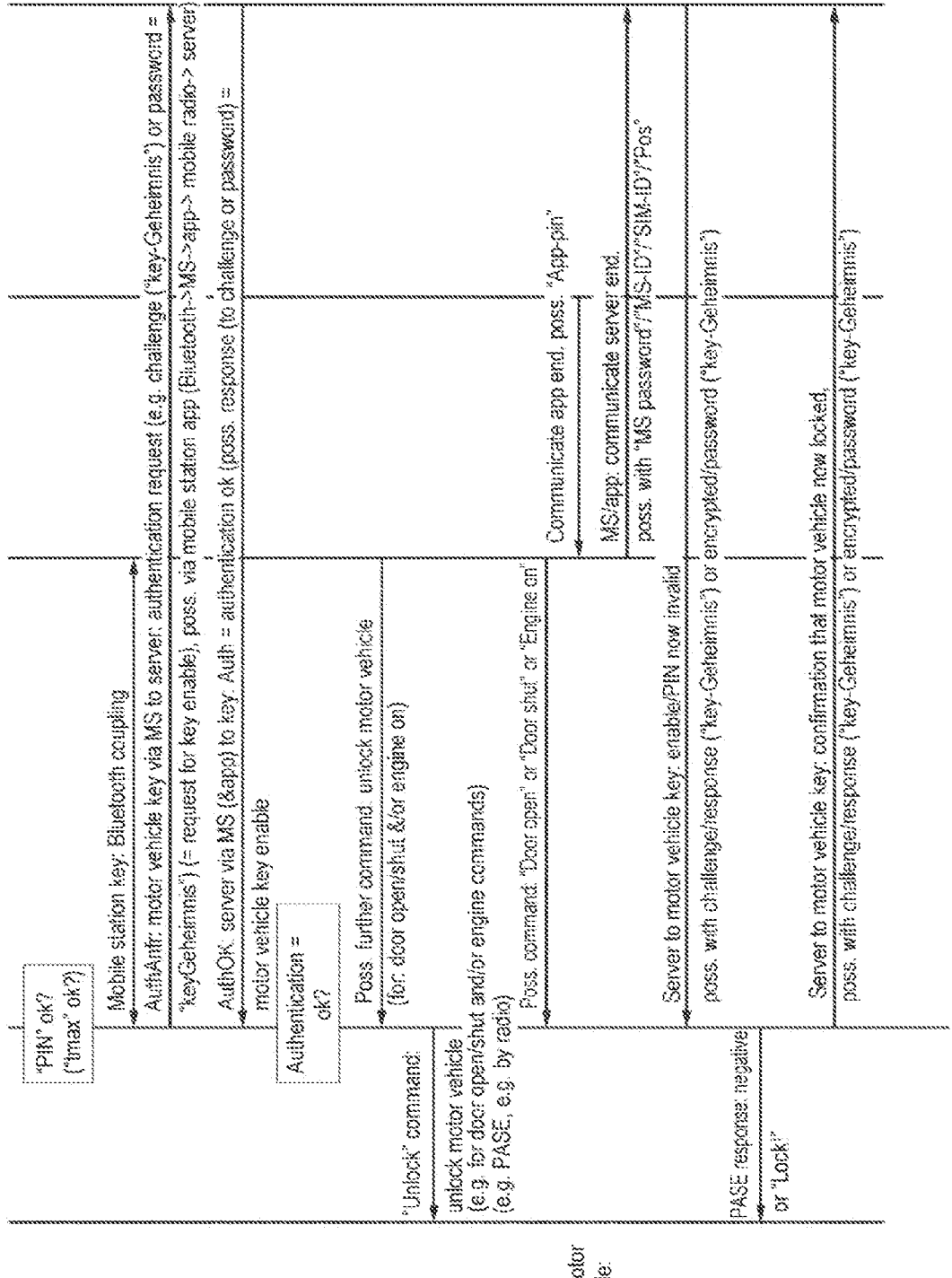

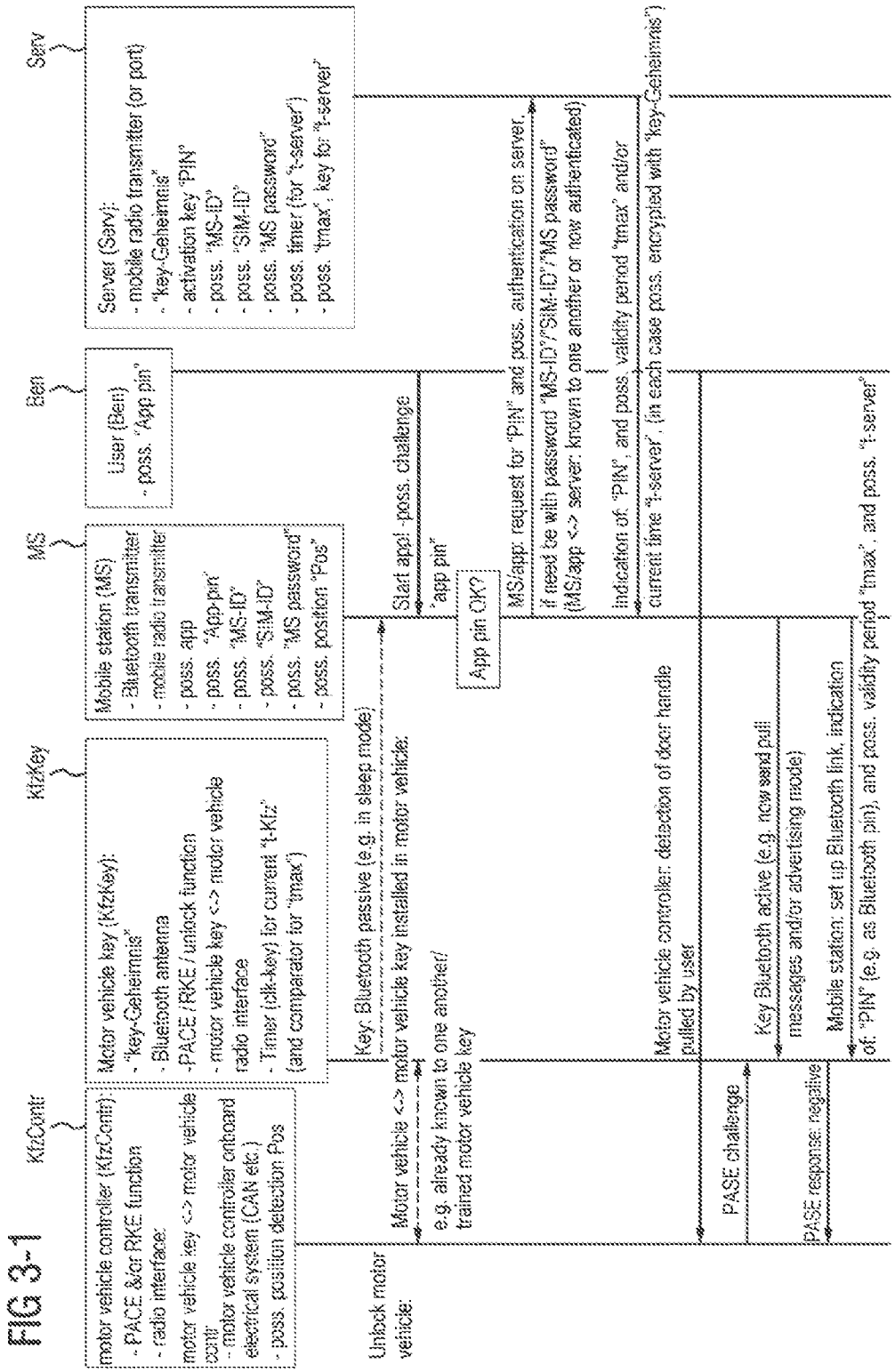

METHODS AND APPARATUSES FOR UNLOCKING A MOTOR VEHICLE HAVING AN ENGINE START AND/OR VEHICLE ENTRY SYSTEM

CROSS-REFERENCE TO RELATED APPLICATIONS

This application is a U.S. National Stage Application of International Application No. PCT/EP2017/051529 filed Jan. 25, 2017, which designates the United States of America, and claims priority to DE Application No. 10 2016 201 603.2 filed Feb. 3, 2016, the contents of which are hereby incorporated by reference in their entirety.

TECHNICAL FIELD

The present disclosure relates to motor vehicles. Various embodiments may include methods and/or apparati for unlocking a motor vehicle having an engine start and/or vehicle entry system.

SUMMARY

The teachings of the present disclosure may be embodied in safe, universal implementation of an engine start and/or vehicle entry system. In particular setup of a Bluetooth link in conjunction with an activation key received from a server via a mobile radio terminal and authentication of a motor vehicle key on a server via a mobile radio terminal can provide a good level of security. The invention can have the transmitter and receiver implemented in particular in a motor vehicle key and/or a mobile radio terminal and/or a server. Authentication requests in particular for security purposes can be made using at least one challenge/response and/or at least one password challenge. A Bluetooth interface of a motor vehicle key may in particular be very rapidly accessible in a sending or advertising mode or in energy-saving fashion before wakeup e.g. by means of vehicle entry attempt activation (such as a pulled door handle and/or Pace/RKE activation) in an initially inactive mode.

As an example, some embodiments include an apparatus (Kfz-key) having a motor vehicle key (Kfz-key) for unlocking (Door open) a motor vehicle (Kfz) having an engine start and/or vehicle entry system (Kfz-Zug), wherein the motor vehicle key (Kfz-key), arrangeable by a motor vehicle (Kfz), has a Bluetooth antenna (BluetAnt) and moreover a motor vehicle communication antenna (KfzKeyAnt), wherein the motor vehicle key (Kfz-key) is intended (App) to use its Bluetooth antenna (BluetAnt) to set up a Bluetooth link (Bluet) to a mobile radio terminal (MS) using an activation key (PIN) known to the motor vehicle key (Kfz-key), and to instruct (Entrieg) a motor vehicle controller (KfzContrl) installed in the motor vehicle (Kfz) to prompt unlocking ("Door open", "Door shut", "Engine on") of the motor vehicle (Kfz).

In some embodiments, there is a motor vehicle key (Kfz-key) for unlocking (Door open) a motor vehicle (Kfz) having an engine start and/or vehicle entry system (Kfz-Zug), wherein the motor vehicle key (Kfz-key) is configured (App) to use a Bluetooth link (Bluet) to the mobile radio terminal (MS) to request (AuthAnfr) an authentication (Ruth) from a server (Serv), and only if the motor vehicle key (Kfz-key) receives an authentication (Auth-ok) from the server (Serv) from the mobile radio terminal (MS), to instruct (Entrieg) a motor vehicle controller (KfzContrl) installed in the motor vehicle (Kfz) to prompt unlocking ("Door open", "Door shut", "Engine on") of the motor vehicle (Kfz).

As another example, some embodiments include an apparatus having a mobile radio terminal (MS) for unlocking (Door open) a motor vehicle (Kfz) having an engine start and/or vehicle entry system (Kfz-Zug), wherein the mobile radio terminal (MS) is configured to use a mobile radio link (Mob) to a server (Serv) to request ("MS-ID"/"SIM-ID"/ "MS-password") an activation key (PIN) from the server (Serv), and to use the activation key (PIN) received in the mobile radio terminal (MS) from the server (Serv) to set up a Bluetooth link (Bluet) to a motor vehicle key (Kfz-key) arrangeable in a motor vehicle (Kfz).

In some embodiments, there is a mobile radio terminal (MS) for unlocking (Door open) a motor vehicle (Kfz) having an engine start and/or vehicle entry system (Kfz-Zug), wherein the mobile radio terminal (MS) is configured (App) to forward an authentication request (AuthAnfr) of the motor vehicle key (Kfz-key), received from the motor vehicle key (Kfz-key) via the Bluetooth link (Bluet), from the mobile station (MS) to the server (Serv) via a mobile radio link (Mobi), and to forward an authentication confirmation (AuthOK) from the server (Serv), received via a mobile radio link (Mobi), to the motor vehicle key (Kfz-key) via the Bluetooth link (Bluet).

As another example, some embodiments include an apparatus in the form of a system for unlocking (Door open) a motor vehicle (Kfz) having an engine start and/or vehicle entry system (Kfz-Zug), having an apparatus having a motor vehicle key (Kfz-key) as described above and an apparatus having a mobile radio terminal (MS) as described above.

In some embodiments, one or some or all of the transmissions of an authentication request (AuthAnfr) and/or of an authentication response (AuthOK) and/or of an activation key (PIN) take place via a mobile radio link (Mob) and/or via a Bluetooth link (Bluet) in each case, in particular with at least one challenge/response and/or password challenge using at least one secret (key-Geheimnis) stored in the motor vehicle key (Kfz-key) and/or in the server (Serv).

In some embodiments, the motor vehicle key (Kfz-key) is configured either to continually look for Bluetooth links (advertising mode) or to look for Bluetooth links only after receipt of a request (PASEAbfrage) via in particular a motor vehicle communication antenna (KfzKeyAnt) and radio link (KfzKey-Kfz-Contr) in addition to the Bluetooth antenna (sleep mode→advertising mode).

In some embodiments, between a motor vehicle key (Kfz-key) arranged and/or installed and/or fixed in a motor vehicle (Kfz) having a motor vehicle controller (KfzContrl) and a motor vehicle controller (KfzContrl) there is provision for a transmission of messages (Entrieg, PASEAbfrage, PASEAntwortNegativ) via a motor-vehicle-key-to-vehicle-controller-radio link (Kfz-Key-KfzContr) between a motor vehicle key antenna (KfzKeyAnt) in the motor vehicle key (KfzKey) and a motor vehicle communication antenna (KfzAnt) in the motor vehicle controller (KfzContrl), in particular using a motor-vehicle-key-to-vehicle-controller radio link (Kfz-Key-KfzContr) by LF radio and/or HF radio and a motor vehicle key antenna (KfzKeyAnt) and motor-vehicle communication antenna (KfzAnt) for LF radio and/or HF radio.

In some embodiments, the apparatus is configured to authenticate ("MS-ID"/"SIM-ID"/"MS-password") the mobile radio terminal (MS) to the server (Serv) before or after or with a request ("PIN=?") from the mobile radio terminal (MS) to the server (Serv) for an activation key (PIN).

In some embodiments, the apparatus is configured to synchronize a clock (Clk-key) in the motor vehicle key (Kfz-key) by communicating a time of day (t-server) of a clock in the server (Serv) to the motor vehicle key (Kfz-key) via a mobile radio link (Mobi) and via a Bluetooth link (Bluet).

In some embodiments, the apparatus is configured to communicate a period (tmax) for a validity of an activation key (PIN) from the server (Serv) to the mobile radio terminal (MS) via a mobile radio link (Mobi) and from the mobile radio terminal (MS) to the motor vehicle key (Kfz-key) via a Bluetooth link (Bluet).

As another example, some embodiments include a method for unlocking a motor vehicle (Kfz) having an engine start and/or vehicle entry system (Kfz-Zug), wherein a mobile radio terminal (MS) uses a mobile radio link (Mobi) to request and receive an activation key (PIN) from a server (Serv), wherein the mobile radio terminal (MS) uses the activation key (PIN) to set up a Bluetooth link (Bluet) between the mobile station (MS) and a motor vehicle key (Kfz-key) arranged and/or installed and/or fixed in a motor vehicle (Kfz), wherein the motor vehicle key (Kfz-key) uses a Bluetooth link (Bluet) to the mobile station (MS) and a mobile radio link (Mobi) from the mobile station (MS) to the server (Serv) to request (Ruth Anfr) an authentication (Auth-ok) from the server (Serv) using at least one secret (key-Geheimnis) stored in the motor vehicle key (Kfz-key) and/or in the server (Serv), and wherein if the motor vehicle key (Kfz-key) obtains confirmation of an authentication (Auth-ok) from the server (Serv), the motor vehicle key (Kfz-key) instructs (Entrieg) a motor vehicle controller (KfzContrl) installed in the motor vehicle (Kfz) to prompt unlocking ("Door open", "Door shut", "Engine on") of the motor vehicle (Kfz).

BRIEF DESCRIPTION OF THE DRAWINGS

Further features and advantages of some embodiments will emerge from the following description of exemplary embodiments of the invention with reference to the drawing, in which, to illustrate some possible configurations of the invention, in each case in simplified schematic form, by way of example.

DETAILED DESCRIPTION

Figure 1:
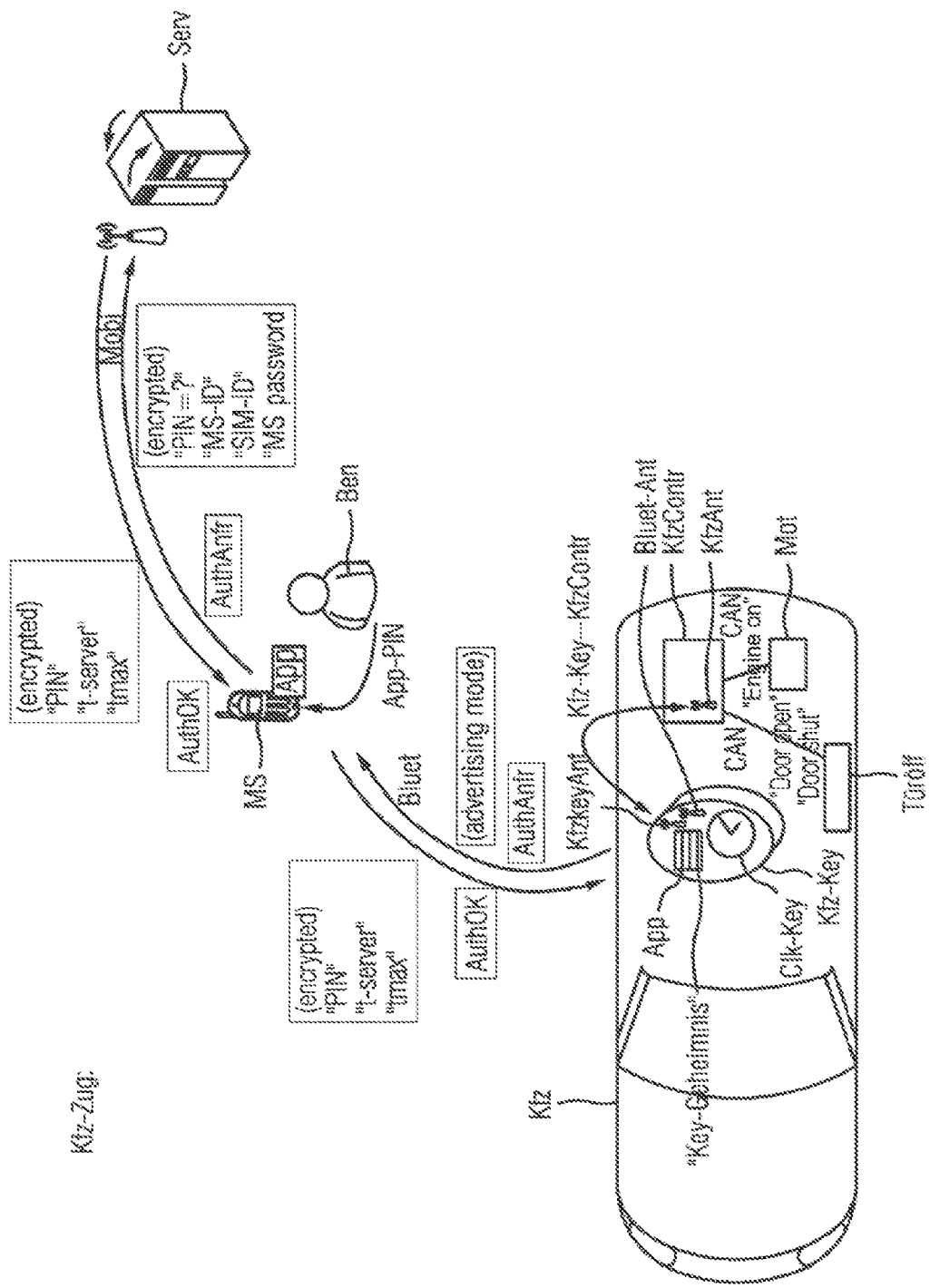
FIG. 1 shows an overview of communication between server, mobile radio terminal, motor vehicle key, motor vehicle controller, door opener, engine—by mobile radio, Bluetooth and a further vehicle-internal radio interface, according to teachings of the present disclosure.

FIG. 1 shows, for an example embodiment, an overview of some components and of a communication between a server Serv, a mobile radio terminal MS, a motor vehicle key Kfz-key (depicted in enlarged fashion) arranged and/or permanently installed in a vehicle Kfz, a motor vehicle controller KfzContr of the vehicle Kfz, a door opener Türöff, an engine Mot, specifically in each case via radio links by mobile radio Mob and/or Bluetooth Bluet and/or a further vehicle-internal radio interface (PACE, RKE etc) KfzKey-KfzContr and/or by wired vehicle bus CAN.

Vehicles Kfz such as e.g. the one depicted in schematically simplified fashion in FIG. 1 can generally have proprietary interfaces for unlocking (opening), locking (closing), and/or starting. Vehicles Kfz can be delivered with a limited number of (for the most part two) motor vehicle keys Kfz-key, and it is also possible for only a limited number (e.g. limited to 8) of additional motor vehicle keys Kfz-key to be trained. If it is desirable to provide a much larger number of users—e.g. in the case of company fleets or in car sharing or in the case of rental vehicles—with motor vehicle keys Kfz-key and/or to give these motor vehicle keys Kfz-key a limited operating time, some embodiments may to store the (activation) "keys" in accordance with configurations of the invention virtually on a server Serv. according to teachings of the present disclosure; the vehicles Kfz subsequently have electronics installed in them that can bypass the existing security mechanisms (for example using a duplicate key). These electronics have access to a server Serv via a mobile radio link and/or accept other motor vehicle keys Kfz-key provided via a server Serv (e.g. by means of smartphone access).

Figures 2, 3:
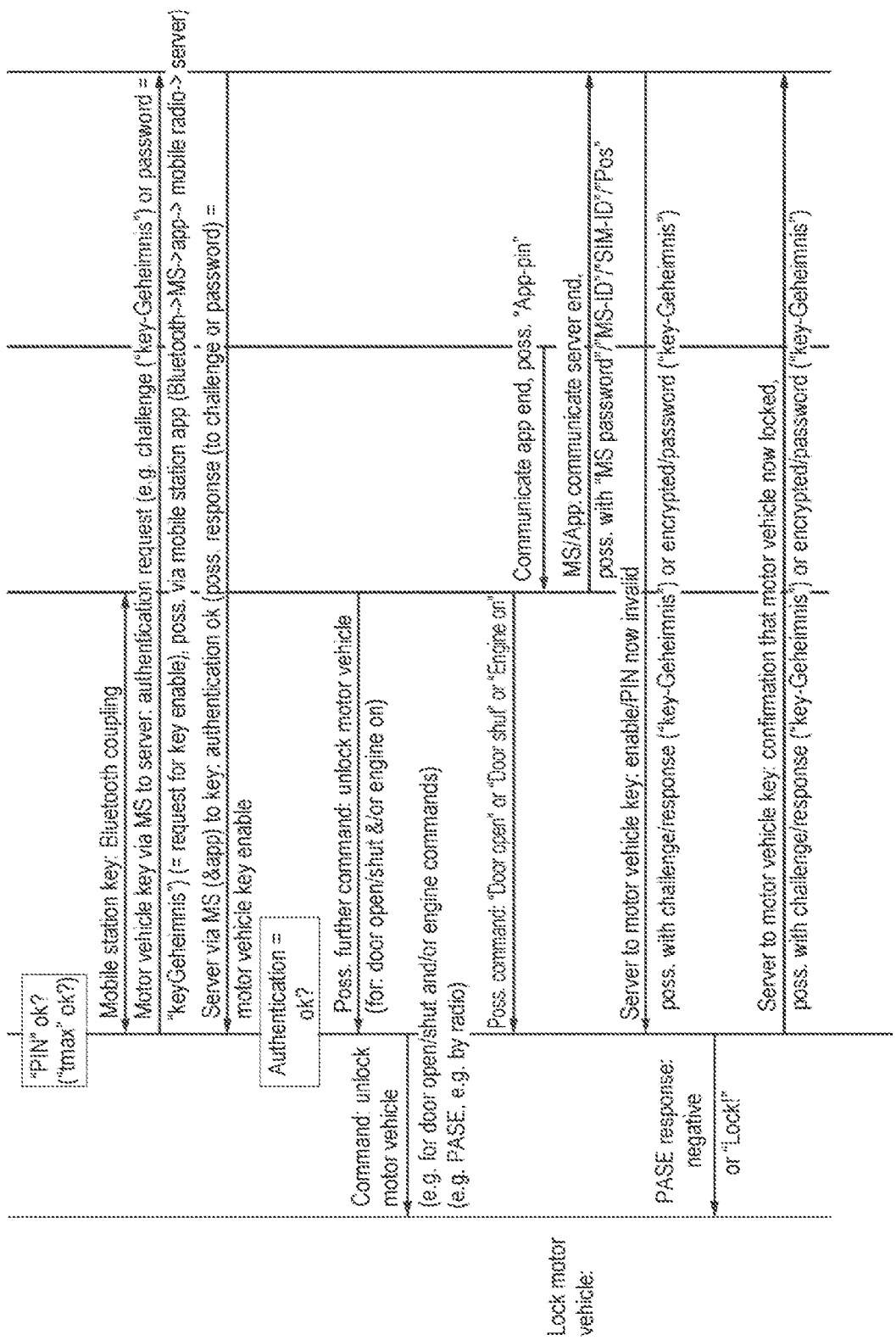
FIG. 2 (depicted on pages FIG. 2-1 and FIG. 2-2 for reasons of space) shows an example of a cycle of motor vehicle unlocking, according to teachings of the present disclosure.
FIG. 3 (depicted on pages FIG. 3-1 and FIG. 3-2 for reasons of space) shows a further example of a cycle of motor vehicle unlocking according to teachings of the present disclosure.

In some embodiments, depicted in simplified fashion by way of example in FIGS. 1, 2 and 3, it is possible for (instead of additional electronics electrically connected in the vehicle Kfz) a (e.g. single) special motor vehicle key Kfz-Key to remain in the vehicle KFz, which is trained to the vehicle Kfz but can be activated only after clearance (PIN, Auth-ok) via a server Serv. In some embodiments, this motor vehicle key Kfz-key remains e.g. in the (ignition lock, etc., of the) motor vehicle Kfz and, from there, can use e.g. a protocol for radio keys and/or RKE, etc., protocol to open and close the vehicle Kfz and/or can be used as a transponder key for clearance to start the engine Mot of the vehicle Kfz.

In some embodiments, such as that shown in FIG. 1, this motor vehicle key Kfz-key can only be used if it is enabled (PIN and/or Auth-ok) via the Bluetooth antenna Blue-Ant contained therein and a Bluetooth link Bluet. The enabling is effected via the Bluetooth link Bluet and a mobile radio link Mobi of the mobile radio (in particular smartphone) MS (e.g. via a mobile radio network) to a server Serv.

In some embodiments, to this end, the motor vehicle key Kfz-key has at least one (or more) additional secret key-Geheimnis that is used for an end-to-end encryption and/or for a challenge/response and/or password challenge on the server Serv. The authentication method able to be used is a challenge/response method, wherein the motor vehicle key Kfz-key sends the challenge (based on its secret) and the server Serv the response, or vice versa; a reciprocal challenge/response method or other cryptographical methods using one or more secrets would also be able to be used.

In some embodiments, this authentication (of the key Kfz-key and server Serv to one another) presupposes preceding or parallel authentication of the user Ben and/or of his mobile radio terminal MS on a server Serv (e.g. also taking into consideration at least one secret (MS-ID, SIM-ID, MS-password etc.) in the MS and/or (app pin) with the user Ben). This can ensure that entry (Door open, Engine on) to the vehicle Kfz is granted only to the correct user Ben. Enabling can comprise the radio remote control functions (Door open, Door shut) for opening and closing, and/or starting of the vehicle (Engine on).

A cycle (explained in more detail below using the examples in FIGS. 2 and 3) may, in simplified fashion, be e.g. as follows. The (special) motor vehicle key Kfz-key is arranged and/or permanently fitted and/or installed and/or enclosed in the vehicle Kfz. The user Ben is already authenticated or is now authenticated on the server Serv by means of his mobile radio terminal (in particular smartphone) MS (MS-ID, SIM-ID, MS-password etc.). The user Ben has e.g. activated a special application/app/piece of software (App) in the mobile radio terminal MS that provides him (from the server Serv) with an activation key PIN in the form of e.g. a pin number for the Bluetooth coupling (via the Bluetooth link Bluet) using the key Kfz-key (which activation key PIN may be e.g. specific to each user Ben and e.g. known to the key Kfz-key for all permitted users).

In some embodiments, the following two cases are possible. Case a) e.g. for a PASE and/or passive opening system in the vehicle:

The new user Ben pulls a door handle of a vehicle Kfz. The vehicle Kfz starts a PASE challenge and/or authentication check for opening. This wakes up (e.g. via a radio interface KfzKey-KfzContr) the motor vehicle key Kfz-key. The motor vehicle key Kfz-key responds to the PASE challenge in the negative, but subsequently activates its Bluetooth interface (which uses its Bluetooth antenna Bluet-Ant).

Case b) e.g. for a KE vehicle Kfz and/or radio key system:

The motor vehicle key Kfz-key has its Bluetooth interface (that is to say its Bluetooth interface using its Bluetooth antenna Bluet-Ant) in the advertising mode and/or a ready-to-receive mode.

As FIG. 2 depicts by way of example, to be able to "unlock a motor vehicle", the user Ben can start an application/app/piece of software in his mobile radio terminal MS (if need be with a challenge and check on an app pin by the application/app/software), and the mobile station MS (e.g. after transmitting and checking an authentication "MS-ID"/ "SIM-ID"/"MS-password" for a server Serv) uses a mobile radio link Mob to ask a server Serv for an activation key PIN (and if need be the current time of day t-server and/or PIN validity period tmax), the mobile station MS receives this activation key (PIN) from the server Serv in the case of positive authentication and from then on can send it (PIN) as an in particular Bluetooth authentication/Bluetooth coupling password by Bluetooth link Bluet to the key Kfz-key.

The new user Ben now connects (if need be after waking up the motor vehicle controller KfzContr and/or key Kfz-key e.g. by pulling a door handle of the motor vehicle, and if need be an unsuccessful PASE challenge and PASE response) his mobile radio terminal/smartphone MS to the motor vehicle key Kfz-key by Bluetooth link Bluet. To this end, it (MS) uses (e.g. as a Bluetooth authentication code) the activation key PIN provided (to the mobile radio terminal MS) by the server Serv (in this case as a Bluetooth authentication code), and if need be also sends a time of day t-server and/or an activation key (PIN) validity period tmax.

The key Kfz-key checks the activation key PIN received (as Bluetooth coupling authentication). After Bluetooth coupling (of Kfz-key and MS) has taken place, the server Serv is also authenticated for the motor vehicle key Kfz-key in FIG. 2 (via the two links Bluet, Mob in series with one another in FIG. 2).

To this end, e.g. an authentication request AuthAnfr is sent from the motor vehicle key kfz-key to the server Serv (e.g. as a challenge with a secret keyGeheimnis and/or a password challenge from the key), e.g. possibly via a mobile station app (Bluetooth→MS→app→Mobilfunk→server), and after a successful check an authentication confirmation AuthOK is transmitted from the server Serv via the mobile radio terminal MS (and if need be an app/a program) to the key kfz-key (e.g. with a response (to a challenge and/or with a password).

If the (authentication, if provided, and the) Bluetooth coupling Bluet is successful, then the motor vehicle key Kfz-key is enabled thereby and the motor vehicle Kfz or at least one of its door openers Türööff (and/or a starting process for the engine Mot) is now unlocked automatically and/or by an applicable command from the mobile radio terminal/smartphone MS. This unlocking takes place, according to one configuration, (only) by means of an open command Door open from the motor vehicle key Kfz-key by radio (e.g. via a further radio link between a motor vehicle key antenna KfzKeyAnt and a motor vehicle control antenna KfzAnt, or theoretically also via Bluetooth) to a controller KfzContr of the vehicle Kfz, which controller sends an open command (Door open) to at least one door opener Türööff of a door of the motor vehicle.

In some embodiments, the enabling (by the activation key PIN) is accompanied by the transmission of a validity period tmax after which the motor vehicle key Kfz-key stops working in this regard. A renewed connection (via MS and Bluet, Mob) between the motor vehicle key Kfz-key and the server Serv can renew or extend this validity period tmax. To this end, the (radio) motor vehicle key Kfz-key has an internal clock Clk-key that is synchronized (by t-server) to the server Serv in each case in the event of (if need be intermittent, tmax) enabling (by the activation key PIN).

A desired termination of the use (lock motor vehicle in FIG. 2) is communicated to the server Serv (if need be with authentication of the MS on the server Serv) by the user Ben via his mobile radio terminal MS (if need be by inputting an app pin) e.g. by means of its smartphone app. In this case, the vehicle position Pos is preferably transmitted to the server Serv and if need be a new activation key PIN is transmitted to the motor vehicle key Kfz-key for a next user (as for the first user Ben above) in order to enable said key. Preferably, a check is performed to determine whether the motor vehicle key Kfz-key is in the interior, provided that the (PASE) system and/or vehicle Kfz provide(s) this function in this context. The vehicle Kfz is then locked. The enabling of the motor vehicle key Kfz-key is then canceled and the completion (of motor vehicle locking) is communicated to the server Serv via the Bluetooth link Bluet to the mobile radio terminal/smartphone MS and via the mobile radio link Mob of the latter to the server Serv. Following successful acknowledgement (notification from the server to the motor vehicle key Kfz-key that the enabling/the activation key PIN is now invalid, if need be using challenge/ response and/or password) by the server Serv, the Bluetooth coupling Bluet to the smartphone is canceled and the motor vehicle key Kfz-key returns e.g. to the idle state.

In the example in FIG. 3 for e.g. a passive opening system (e.g. PASE) or radio key system (e.g. RKE) in a vehicle Kfz, the new user Ben pulls a door handle of a motor vehicle Kfz, the motor vehicle Kfz starts a (e.g. PASE) challenge and/or authentication for opening, this wakes up the motor vehicle key Kfz-key, the motor vehicle key Kfz-key responds to the (e.g. PASE) challenge in the negative, but activates its Bluetooth interface/Bluetooth antenna (and now sends e.g. pull messages and/or is now in advertising mode).

In some embodiments, the motor vehicle key Kfz can execute vehicle-specific radio and transponder protocols for a relatively large series of vehicles Kfz. In some embodiments, the vehicle-specific software can also be transmitted by the Bluetooth link Bluet to a mobile radio terminal (in particular smartphone) and from the mobile radio terminal (in particular smartphone) to the motor vehicle key Kfz-key by means of a mobile radio link Mob to a (second) server. To this end, a bootloader having the capability of authentication is usable on this software server Serv.

In some embodiments, the system performs the protocol generation (open/close) and possibly also uses a transponder on the server Serv and to use the smartphone to send it to the motor vehicle key Kfz-key, which now only converts this protocol for the applicable radio interfaces/transponder interfaces. Some embodiments implement operator control of the functions on the mobile radio terminal (in particular smartphone) MS.

As a result of a motor vehicle key Kfz-key communicating with the motor vehicle Kfz via the interfaces (CAN, KfzAnt) thereof provided for this purpose, it would be possible, according to one configuration, for further additional electronics to be dispensed with that would also for the most part still be implemented specifically for different vehicle series. In some embodiments, the motor vehicle key Kfz-key in the available vehicle security system works like a normal motor vehicle key Kfz-key and thus provides the associated security level, whereas today's additional electronics, which are known at least internally, bypass the vehicle security system and provide a substantially lower security level.

An advantage for the aforementioned bootloader may be that no specific additional chips on the motor vehicle key Kfz-key increase the size of the limited program memory, and an update is possible in the field without motor vehicle keys Kfz-key needing to be replaced or taken to a service station. It is also possible for motor vehicle keys Kfz-key having a limited scope of functions (e.g. only opening and closing) to be issued.

After enabling, the user Ben can use the motor vehicle key Kfz-key like a normal vehicle key. In some embodiments, the user Ben can also send the commands from the smartphone, which are then received by the motor vehicle key Kfz-key and converted into radio commands. In this case, the motor vehicle key Kfz-key could also remain in the vehicle Kfz (taking into consideration the limited range of Bluetooth).

What is claimed is:

1. An apparatus comprising:
    a motor vehicle key for unlocking a motor vehicle having a remote engine start and/or vehicle entry system;
    wherein the motor vehicle key comprises a Bluetooth antenna and a motor vehicle communication antenna;
    wherein the motor vehicle key is configured to:
        use the Bluetooth antenna to set up a Bluetooth link to a mobile radio terminal using an activation key stored in a memory of the motor vehicle key; and
        instruct a motor vehicle controller installed in the motor vehicle to prompt an operation of the motor vehicle.

2. The apparatus as claimed in claim 1, wherein the motor vehicle key is configured to:
    use the Bluetooth link to the mobile radio terminal to request an authentication from a server; and
    only if the motor vehicle key receives an authentication from the server, to instruct the motor vehicle controller to prompt unlocking of the motor vehicle.

3. The apparatus as claimed in claim 1, wherein:
    at least one of the transmissions of an authentication request or of an authentication response or of an activation key take place via a mobile radio link or via a Bluetooth link.

4. The apparatus as claimed in claim 1, wherein the motor vehicle key (Kfz-key) is configured to:
    either continually look for Bluetooth links; or
    look for Bluetooth links only after receipt of a request via a motor vehicle communication antenna and radio link in addition to the Bluetooth antenna.

5. The apparatus as claimed in claim 1, wherein messages are transmitted between a motor vehicle key and a motor vehicle controller via a motor-vehicle-key-to-vehicle-controller-radio link between a motor vehicle key antenna in the motor vehicle key and a motor vehicle communication antenna in the motor vehicle controller, using a motor-vehicle-key-to-vehicle-controller radio link.

6. The apparatus as claimed in claim 1, further configured to authenticate the mobile radio terminal to the server with a request from the mobile radio terminal to the server for an activation key.

7. The apparatus as claimed in claim 1, further configured to synchronize a clock in the motor vehicle key by communicating a time of day of a clock in the server to the motor vehicle key via a mobile radio link and via a Bluetooth link.

8. The apparatus as claimed in claim 1, further configured to communicate a period for a validity of an activation key from the server to the mobile radio terminal via a mobile radio link and from the mobile radio terminal to the motor vehicle key via a Bluetooth link.

9. A system for unlocking a motor vehicle having a remote engine start and/or vehicle entry system, the system comprising:
    a motor vehicle key for unlocking a motor vehicle having a remote engine start and/or vehicle entry system; and
    a mobile radio terminal for unlocking the motor vehicle;
    wherein the motor vehicle key comprises a Bluetooth antenna and a motor vehicle communication antenna;
    wherein the motor vehicle key is configured to:
        use the Bluetooth antenna to set up a Bluetooth link to the mobile radio terminal using an activation key stored in a memory of the motor vehicle key; and
        instruct a motor vehicle controller installed in the motor vehicle to prompt an operation of the motor vehicle;
    wherein the mobile radio terminal (MS) is configured to:
        use a mobile radio link to a server to request an activation key from the server; and
        to use the activation key received from the server to set up a Bluetooth link to a motor vehicle key associated with the motor vehicle.

* * * * *